US008260263B2

(12) United States Patent
Wan et al.

(10) Patent No.: US 8,260,263 B2
(45) Date of Patent: Sep. 4, 2012

(54) DYNAMIC VIDEO MESSAGING (75) Inventors: Ping Sum Wan, Cityone Shatin (HK);
Ng Ka Wai, Kowloon (HK)

(73) Assignee: Dialogic Corporation, Montreal, Quebec (CA)

( * ) Notice: Subject to any disclaimer, the term of this patent is extended or adjusted under 35 U.S.C. 154(b) by 1363 days.

(21) Appl. No.: 11/870,580

(22) Filed: Oct. 11, 2007

(65) Prior Publication Data
US 2008/0090553 A1 Apr. 17, 2008

Related U.S. Application Data (60) Provisional application No. 60/851,479, filed on Oct. 13, 2006.

(51) Int. Cl.
*H04M 3/42* (2006.01)
*H04L 29/08* (2006.01)
*H04N 7/14* (2006.01)
*H04W 4/00* (2009.01)

(52) U.S. Cl. .................. 455/412.2; 455/414.4; 455/466; 348/14.02

(58) Field of Classification Search ................ 455/412.1, 455/412.2, 414.4, 466; 348/14.02
See application file for complete search history.

(56) References Cited

U.S. PATENT DOCUMENTS

| 6,867,797 | B1 | 3/2005 | Pound |
| 7,522,182 | B2* | 4/2009 | Bang .......................... 348/14.08 |
| 2002/0118196 | A1 | 8/2002 | Skilling |
| 2004/0203956 | A1* | 10/2004 | Tsampalis ..................... 455/466 |
| 2005/0144284 | A1 | 6/2005 | Ludwig et al. |
| 2005/0220041 | A1 | 10/2005 | Lin |
| 2005/0264647 | A1 | 12/2005 | Rzeszewski et al. |
| 2005/0277431 | A1* | 12/2005 | White ........................... 455/466 |
| 2006/0099942 | A1 | 5/2006 | Tu et al. |
| 2007/0082686 | A1* | 4/2007 | Mumick et al. ............... 455/466 |

OTHER PUBLICATIONS

International Search Report and Written Opinion mailed Mar. 18, 2008 in corresponding International Application No. PCT/US07/81095.

* cited by examiner

*Primary Examiner* — Un C Cho
(74) *Attorney, Agent, or Firm* — Weingarten, Schurgin, Gagnebin & Lebovici LLP (57) ABSTRACT A video messaging service is compatible with multiple transport technologies (such as 2G and 3G networks), and operable to render an integrated video message having voice and corresponding video in a matter consistent with the capabilities of the recipient device. The video messaging service receives a voice (audio) and identifies a video component, computes a video format compatible with an intended recipient device, and generates an integrated video message renderable on the recipient device. The video messaging service identifies the initiator and recipient as 2G or 3G network conversant, and identifies the rendering capabilities of the recipient device, such as memory and mailboxes. The system employs MMS (Multimedia Message Service) to encapsulate independent audio and video components as an integrated message including a voice message and a video source. Depending on the capabilities of the recipient device, a .gif ( ) video rendering or a so-called 3GP rendering is also provided.

20 Claims, 7 Drawing Sheets

DYNAMIC VIDEO MESSAGING

CLAIM TO BENEFIT OF EARLIER FILED PATENT APPLICATIONS

This invention claims the benefit under 35 U.S.C. 119(e) of the filing date and disclosure contained in Provisional Patent Application having U.S. Ser. No. 60/851,479 filed, Oct. 13, 2006, entitled "Video SMS", incorporated herein by reference.

BACKGROUND

A messaging environment includes many forms of files and transmission mediums for transmitting audio messages and other forms of audio, such as music downloads, mailbox messages, and interactive voice response (IVR) systems, to name several. More recently, increased transmission bandwidth and robust device capabilities have made video messaging feasible for personal handset devices. Many protocols, encoding schemes and transport mechanisms exist for both audio and video data, defining a varied landscape of possible paths for communication. Further, the multitude of user devices, and particularly of personal handsets, provide a dizzying array of capabilities to consider when serving video. Accordingly, some video transmission mechanisms have not encountered widespread popularity, and the disparity of devices available, along with a plurality of underlying networks (i.e. 2G and 3G wireless networks) presents a multitude of processing complexities to be considered when establishing video communications between users.

Modern encoding formats strive for flexibility. While some may have emerged directed to a particular type of transmission (i.e. audio, video, text, data, etc), many represent multiple types or are at least evolving to support additional types. For example, the so-called Short Message Service (SMS) is a text messaging system widely deployed on mobile phones around the world. A richer service, Multimedia Message Service (MMS) has been defined and is being deployed in some areas, however MMS has not been widely adopted. MMS supports voice, image and video messages (or combinations thereof). Several problems have contributed to the slow adoption of MMS including, lack of interoperability between operators' networks, inadequate speed on 2G networks to handle video from 3G handsets, and lack of consistent capabilities between 2G and 3G handsets.

SUMMARY

In a video messaging environment, users employ handset devices to communicate with other users using video messages. The modern proliferation of video enabled handset devices (phones) provides users with capability for still photo and/or animated video, as well as to deposit it as an video message for accompanying a video call as discussed below. However, evolution of the industry has resulted in a multitude of encoding formats (protocols) and transport networks for multimedia (audio and video) messaging. Differences between handset devices and/or transport networks between users complicates multimedia messaging between users having dissimilar equipment. Configurations herein are based, in part, on the observation that, in a conventional video messaging environment, video users need to have compatible networks and/or handset devices in order to seamlessly communicate via video messaging.

Transport networks for wireless messaging include so-called 2G and 3G networks, and additional transport network technologies are evolving the industry even further. While most modern handsets include a video screen and often a camera, capabilities for handling true video messaging vary. Some handset devices are capable of only still photo capturing and/or rendering, while others may be capable of supporting animated video formats yet do not have sufficient capability to render an appreciable quantity of video. Conventional approaches suffer from the shortcoming that incompatibilities between user devices and networks, along with varying acceptance of multimedia encoding formats (protocols), hinders free exchange of video messaging between a broad user base. For example, the so-called multimedia message service (MMS), intended to provide efficient encoding and delivery for video messaging, has yet to be embraced in a widespread manner.

Recently, a non-standard, voice-only version of MMS has been deployed in some markets. This service is commonly called Voice SMS. There are several different implementations, but the guiding principal has been to provide a service that works with existing handsets and existing networks, anywhere that SMS is supported, i.e. virtually everywhere. Voice SMS provides the ability to send a short voice message from one mobile phone to another. If the recipient phone is on and registered with the network, the receiving party gets a message notification almost immediately. Otherwise they see a message waiting indication the next time their phone is on and connected.

Animation is facilitated through the use of avatars, which are pictorial representations of a user, and may be fanciful or arbitrary. Technology exists which can animate an avatar image of a person's, an animal's or a cartoon character's head so their lips move in synchronization with an arbitrary voice recording. Finally, video transcoding and translating capability is employed which can automatically reduce the average bit rate of a recorded video signal by sacrificing resolution and/or frame rate.

Accordingly, configurations herein substantially overcome the shortcomings of video messaging incompatibility by providing a video messaging service compatible with multiple transport technologies (such as 2G and 3G networks), and operable to render an integrated video message having voice and corresponding video in a matter consistent with the capabilities of the recipient device. The video messaging service receives a voice (audio) component, and identifies or accesses a video component, computes a video format compatible with the intended recipient device, and generates an integrated video message renderable on the recipient device. A user may deposit the video component as an video message with an video call in an 3G network or using a video recording capable phone for generating video clip. The video component from the initiator can also be created with a chosen avatar only.

In the example arrangement, the video messaging service identifies the initiator and recipient as 2G or 3G network conversant, and identifies the rendering capabilities of the recipient device, such as available memory and mailbox affiliation. Depending on the capabilities of the recipient device, a .gif (Graphics Interchange Format) video rendering or a so-called 3GP rendering is provided to the recipient device. Animation is provided by manipulating avatars or video clips in a manner consistent with the capabilities of the recipient device. Avatar processing animates an image of a person's, an animal's or a cartoon character's head so their lips move in synchronization with an arbitrary voice (audio) source. Further, video transcoding and translating capability exists which can automatically reduce the average bit rate of a recorded video signal by sacrificing resolution and/or frame rate to adapt to a range of memory capabilities in user handset devices.

Various forms of avatar animation, which are much less resource intensive than typical video messaging, are employed to render the video component. In this manner, the disclosed system provides an integrated (audio and video) message between users of either 2G or 3G networks with a video rendering compatible with the buffering and decoding capabilities of the recipient device.

In further detail, configurations discussed below perform method of video messaging in a video SMS subsystem by identifying a video source for a video component of a multimedia message, and receiving a voice message to accompany the video source, such that the voice message is independent of the video source. The video source may be a previously uploaded avatar stored in the video SMS subsystem to accompany voice messages. Alternatively, an avatar may be menu selected to accompany the voice message. The subsystem integrates the video source in the voice message to generate an integrated multimedia message, and identifies a recipient device associated with an intended user for receiving the multimedia message, the integrated multimedia message encoded to correspond to capabilities of the recipient device. The subsystem then renders the integrated video message to the recipient device as an animated avatar or video clip accompanying the voice message in a synchronized form such that the animated movement of the image tracks the spoken (voice) component off the integrated message.

Alternate configurations of the invention include a multiprogramming or multiprocessing computerized device such as a workstation, handheld or laptop computer or dedicated computing device or the like configured with software and/or circuitry (e.g., a processor as summarized above) to process any or all of the method operations disclosed herein as embodiments of the invention. Still other embodiments of the invention include software programs such as a Java Virtual Machine and/or an operating system that can operate alone or in conjunction with each other with a multiprocessing computerized device to perform the method embodiment steps and operations summarized above and disclosed in detail below. One such embodiment comprises a computer program product that has a computer-readable medium including computer program logic encoded thereon that, when performed in a multiprocessing computerized device having a coupling of a memory and a processor, programs the processor to perform the operations disclosed herein as embodiments of the invention to carry out data access requests. Such arrangements of the invention are typically provided as software, code and/or other data (e.g., data structures) arranged or encoded on a computer readable medium such as an optical medium (e.g., CD-ROM), floppy or hard disk or other medium such as firmware or microcode in one or more ROM or RAM or PROM chips, field programmable gate arrays (FPGAs) or as an Application Specific Integrated Circuit (ASIC). The software or firmware or other such configurations can be installed onto the computerized device (e.g., during operating system or execution environment installation) to cause the computerized device to perform the techniques explained herein as embodiments of the invention.

BRIEF DESCRIPTION OF THE DRAWINGS

The foregoing and other objects, features and advantages of the invention will be apparent from the following description of particular embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION

The disclosed method providing a video messaging service compatible with multiple transport technologies (such as 2G and 3G networks), and operable to render an integrated video message having voice and corresponding video in a matter consistent with the capabilities of the recipient device. Dissimilarities between user devices and/or transport networks often impose obstacles to video messaging. The video messaging service receives a voice (audio) component, and obtains a video component such as an avatar or video clip from a preexisting upload or from the initiator device, computes a video format compatible with the intended recipient device, and generates an integrated video message renderable on the recipient device. Conventional users, unable to perform video messaging, can upload and/or select an avatar image for use in a video message. In the example arrangement, the video messaging service identifies the initiator and recipient as 2G or 3G network conversant, and upon an attempt by the recipient handset device to retrieve the message, identifies the rendering capabilities of the recipient device, such as available memory and mailbox affiliation. The video SMS subsystem need not establish a concurrent connection between the initiator device 110 and the recipient device 120, but rather maintains the video message for later retrieval by the recipient 120. The video SMS subsystem employs MMS (Multimedia Message Service) to encapsulate independent audio and video components as an integrated message including a voice message and a video source. Particular efficiency is obtained by employing an animated avatar as the video component for handsets with limited memory. Depending on the capabilities of the recipient device, a .gif video rendering or a so-called 3GP rendering is provided to the recipient device. Animation is provided by manipulating avatars or video clips in a manner consistent with the buffering capabilities of the recipient device. In this manner, video messaging between 2G and 3G users is performed in a seamless fashion in a manner most appropriate (efficient) for the respective initiator and recipient handset devices.

In operation, a recipient may receive a text message used to alert the recipient that a multimedia message had been deposited into the mailbox for retrieval. In some handset, the retrieval can be set to proceed automatically or else recipient has to click on a link in the message or click a button on the handset to initiate the retrieval process, emulating a typical MMS retrieval procedure.

Figure 1:
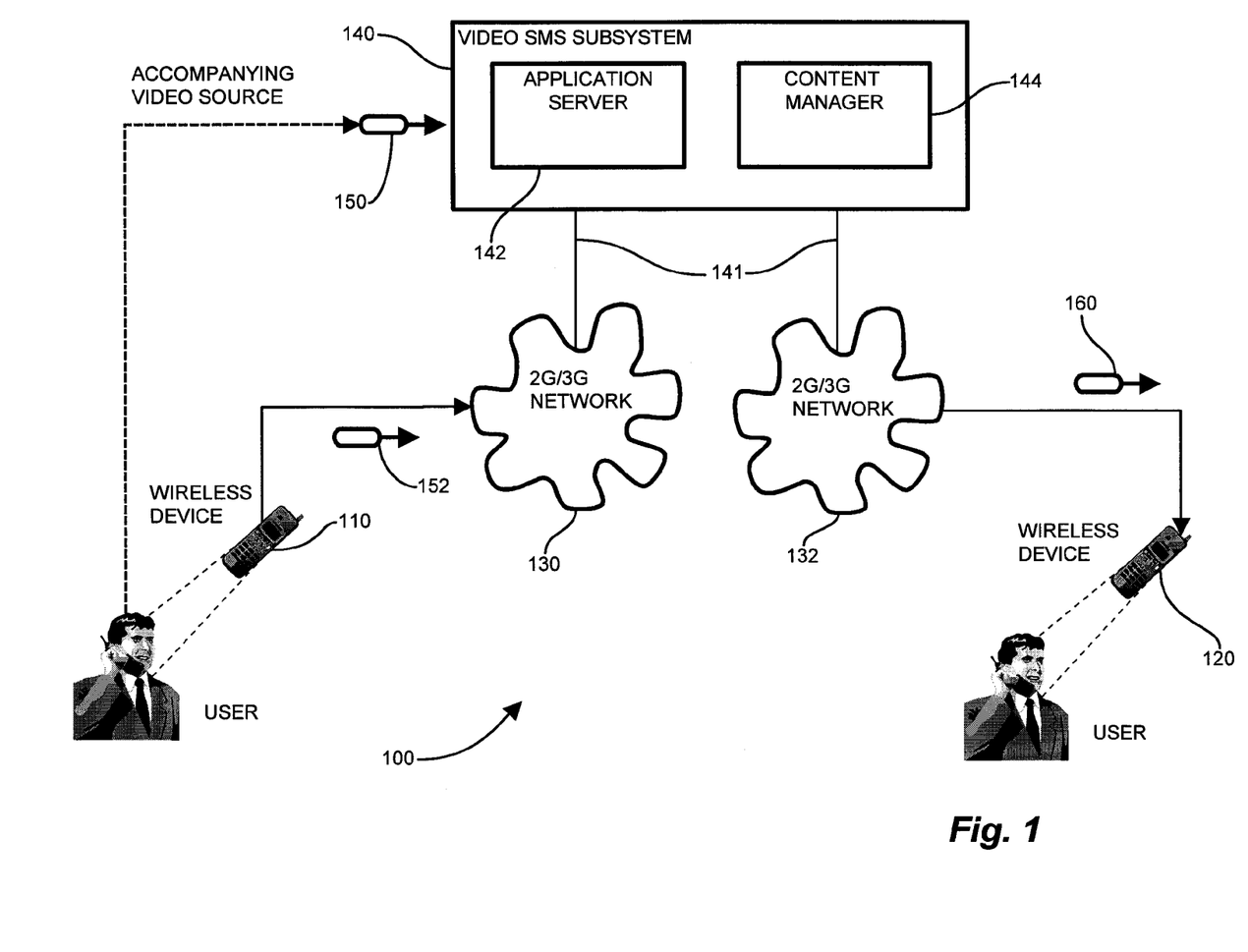
FIG. 1 is a context diagram of an exemplary video messaging environment employing wireless handset devices suitable for use with the present invention.

FIG. 1 is a context diagram of an exemplary video messaging environment 100 employing wireless handset devices suitable for use with the present invention. Referring to FIG. 1, the environment 100 includes an initiator device 110 and a recipient device 120 coupled to an initiator network 130 and a recipient network 132, respectively. The initiator network 130 and recipient network 132 each support a respective type of transport technology, such as 2G or 3G, but may incorporate other formats/transport mechanisms and may be the same network if the devices 110, 120 are employing a common technology. The networks 130, 132 couple to a video messaging server such as the disclosed video SMS subsystem 140. The video SMS subsystem 140 is a networking device operable with each of the networks 130, 132 for providing video messaging services as disclosed herein. The subsystem 140 includes an interface to the network 141, an application server 142 and a content manager 144. The application server 142 identifies the type of network 130, 132 which the initiator 110 and recipient 120 devices are employing, and executes the logic for integrating a video source 150 and voice message 152 into an integrated video message 160 renderable on the recipient device 120.

If the video source 150 comes from the handset (e.g. initiator 110) side, then the call must be a 3G video call which in such case, video and audio content are interleaved together already. In such a scenario the video SMS subsystem 140 system handles the call by:
1. extracting the audio part and combine with an avatar of the initiator's own choice to give an lip-sync animation to be sent to the recipient
2. maintaining the video/audio bundling as it is and stored it in 3gp format for either retrieval via another 3G video call or send the 3gp file embedded in an MMS, however this option is less desirable as the size of such 3gp file is usually too big to send over MMS, due to network carrier constraints.

The content manager 144 generates an animated video portion corresponding to the voice message 152 based on an available video source and the rendering capabilities of the recipient 120. Alternatively, a video clip received from the initiator device 110 supplies the video component, however memory limitations of the initiator 110 and recipient 120 devices may limit the integration of a video clip.

In the case of a 3G recipient, the integrated video message 160 may take the form of a 3GP message. 3GP is a simplified version of the MPEG-4 Part 14 (MP4) container format, designed to decrease storage and bandwidth requirements in order to accommodate mobile phones. It stores video streams as MPEG-4 Part 2 or H.263 or MPEG-4 Part 10 (AVC/H.264), and audio streams as AMR-NB, AMR-WB, AMR-WB+ or AAC-LC. A 3GP file is always big-endian, storing and transferring the most significant bytes first. It also contains descriptions of image sizes and bitrate. There are two different standards for this format: 3GPP (for GSM Based Phones, typically having filename extension .3gp), and 3GPP2 (for CDMA Based Phones, typically having filename extension .3g2). Alternatively, for a 3G recipient, a text message may be employed to prompt a video call into the subsystem 140 to retrieve the video message in 3gp format as requested by some carrier. Otherwise, animated GIF in an MMS form is the default format for size consideration although some of the new 2G phone is capable of playing back 3gp video file 2G recipients may receive a .gif file. The Graphics Interchange Format (.gif) is an 8-bit-per-pixel bitmap image format that was introduced in 1987 and has since come into widespread usage on the World Wide Web due to its wide support and portability.

In the example configuration herein, the video SMS subsystem 140 (VSMS) provides an interactive voice response (IVR) user interface, coupled with video support for avatar selection (for handsets so equipped). Various features and advantages of the VSMS are as follows:

Incoming calls to the VSMS system can either be audio call or video call (3G subscriber in a 3G coverage with a 3G capable camera phone only)

For audio calls, the initiator device 110 will record the voice message 152 in the VSMS system to be combined with the chosen avatar (stored in the VSMS system) to give an animated GIF file in the avatar generation engine 148.

This animated GIF file will be embedded with the original voice message 152 (audio recording) in an MMS as the integrated video message 160. The lip-sync activities are enabled by the use of SMIL which is also part of the MMS message, discussed further below.

The resultant MMS 160 will be sent to the MMSC 140 of the carrier's core network 132 for delivery to the target recipient device 120

In the request of some customers, an 3gp file will also be created which is for the retrieval of 3G recipient via video call into the VSMS system 140. For such retrieval, the VSMS 140 checks the MSISDN number of the recipient against a database provided by the carriers to distinguish them from 2G recipient.

Figure 2:
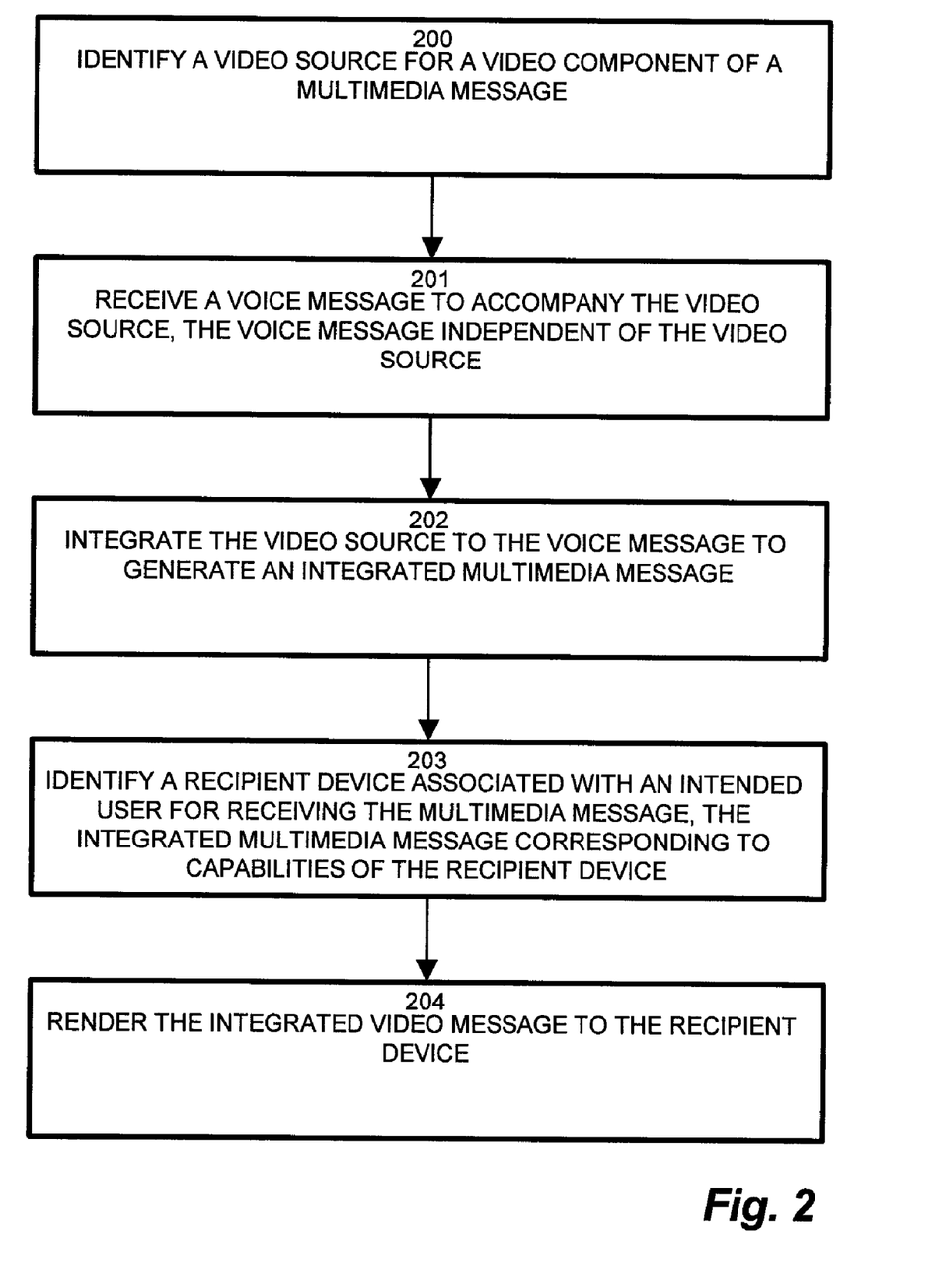
FIG. 2 is a flowchart of video message processing in the environment of FIG. 1.
Figure 3:
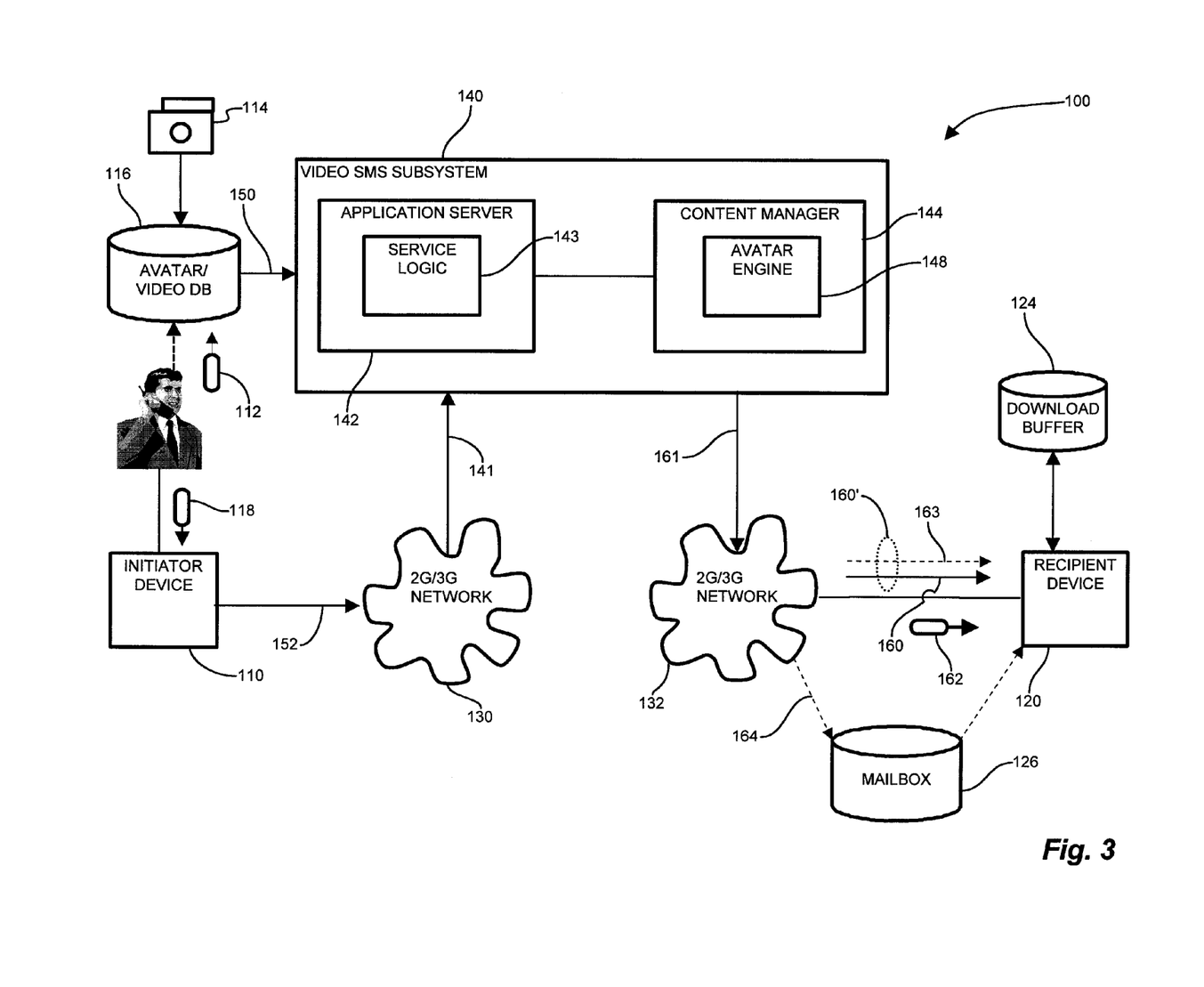
FIG. 3 is a block diagram of video messaging processing in the environment of FIG. 1.

In such case, an SMS message will be sent to the target recipient to alert him/her for the incoming video message and a number will be given in the message for the recipient to make an video call into for the retrieval of the video message. For such a video call, the initiator will record an video message (video+voice) in the VSMS 140 system. The original recording will be stored in the recipient's mail box and an SMS message will be sent to the target recipient to alert him/her for the incoming video message 150 and a number will be given in the message for the recipient to make an video call into for the retrieval of the integrated video message 160. For such retrieval, the VSMS system need to check the MSISDN number of the recipient against a database provided by the carriers to distinguish them from 2G recipient. Alternatively, the audio track (voice message 152) of the recorded video message 150 will be extracted and used to be combined with the chosen avatar (stored in the VSMS system) to give an animated GIF file in the avatar generation engine 148. This animated GIF file will be embedded with the original audio recording in an MMS integrated video message 160. The lip-sync activities are enabled by the use of SMIL which is also part of the MMS message. The resultant MMS will be sent to the MMSC of the carrier's core network for delivery to the target recipient. FIG. 2 is a flowchart of video message processing in the environment of FIG. 1. Referring to FIGS. 1 and 2, the method of video messaging embodying a voiceSMS implementation as defined herein includes, at step 200, identifying a video source 150 for a video component of a multimedia message 160, and receiving a voice message 152 to accompany the video source 150, the voice message being 152 independent of the video source 150 (i.e. not bound to the same protocol or transport network), as depicted at step 201. The video source 150 may be any suitable medium, such as an animated avatar discussed below, or may be a more detailed video clip if sufficient memory is available. The subsystem 140 integrates the video source 150 to the voice message 152 to generate an integrated multimedia message 160, as shown at step 202. The content manager 144 in the subsystem 130 identifies the recipient device 120 associated with an intended user for receiving the multimedia message 160, such that the integrated multimedia message 160 correspond to capabilities of the recipient device 120 is sent, as depicted at step 203. As indicated above, the recipient device 120 may request the integrated video message 160 be sent, involving a handshaking exchange during which the capabilities (i.e. memory) of the recipient device 120 are disclosed. The subsystem 140 sends an appropriate form (either 3GP or .gif) of the video component, and may default to the less memory intensive .gif form if the handshaking exchange does not occur. The subsystem 140 employs the recipient network 132 for rendering the integrated video message 160 to the recipient device 120, as disclosed at step 204, now discussed in further detail. Typically FIG. 3 is a block diagram of video messaging processing in the environment of FIG. 1. Referring to FIGS. 1 and 3, the initiator device 110 may be capable of referencing a variety of video sources 112 in the integrated video message 160. The database 116 in the video SMS subsystem 140 stores predefined avatars for user selection as well as uploaded avatars and video clips for integration with the integrated video message. The video source 112 may emanate from a capture device 114 such as a camera phone (in the case of a 3G user), other upload of video from any suitable device (video camera, computer generated image, etc.) or may be a predetermined avatar selection from the database 116. Such avatars are typically pictorial representations of the user of the initiator device 110, and are operable to be animated for generating an accompanying video portion to a voice component 118 from the user device 110. A video database 116 in the video SMS subsystem stores the available options for the video component. A user may upload the video component from any suitable source, such as a camera 114, to store an avatar image to the database 116. Alternatively, an the may be menu selected, or a separate video clip (in the case of 3G phones) may be employed. Further avatar animation options include augmenting the mood of the avatar as happy, sad or elated, for example. Other video component sources may be envisioned.

The initiator network 130 receives the voice message 152, and invokes the video SMS subsystem 140 for integration with the video source 150 and encoding according to the recipient device 120 specific parameters. The application server 142 identifies the transport technology (2G/3G/other) employed by the recipient network 132 and the available resources of the recipient device 120, such as memory, mailboxes, and display capability, usually upon a fetch request by the recipient device 120. For example, if the recipient device 120 is not a 3G video capable handset in a 3G network coverage area, a mailbox delivery or streaming format may need to be employed.

The video source 112 may be in the form of an avatar or a video clip generated by the user. The content manager 144 invokes an avatar engine 148 to generate animated video from a fixed avatar. The avatar engine 148 generates an animated video portion employing a predefined avatar corresponding to the initiator 110. The avatar engine 148 provides facial movements to the avatar, such as mouth and eye movements, to track the speech in the accompanying voice message 118. Alternatively, in the case of a size limitation for the delivery of MMS either imposed by the carrier or the handset device itself, the avatar engine 148 generates video that alternates between two or three fixed avatars to simulate facial movements using substantially less memory. Such a so-called binary lip-sync rendering is discussed in further detail below. Alternatively, depending on memory capabilities at the recipient device 120, a video clip is employed and synchronized to the voice message 152. Generally, the database 116 stores both a .gif form and a 3GP form of an uploaded avatar, and invokes the most appropriate for the memory available at the recipient device 120. if the handset device's capability is not revealed during the handshaking, the default animated GIF will be sent, then the video SMS subsystem defaults to employing the .gif form of the avatar to ensure compatibility.

The application server 142 invokes the content manager 144 to generate the video portion for encoding with the integrated video message 160. The content manager 144 invokes the avatar engine 148 to generate an animated avatar that tracks the voice message 150. The content manager 144 generates a script 162 using SMIL (Synchronized Multimedia Integration Language) to integrate and synchronize the voice message 150 and the animated avatar (or other video component) obtained from the avatar engine 148. SMIL is built upon XML (Extensible Markup Language)—it is a specialized language to describe the presentation of media objects, as is known in the art. The SMIL script 162 identifies the source file of the voice message and the .gif file containing the animated avatar, and coalesces the video and audio components to generate the integrated video message 160. The SMIL script 162 takes the form, in the example configuration, of an MMS file including the video source 150 and the voice message 152. Typically the video source 150 is in the form of an lip-synch animated avatar (discussed further below) in a .gif form since the use of the SMIL representation is to alleviate memory issues.

If the recipient device 120 is 3G conversant, then the application server 142 will generate a 3GP encoded message as the integrated video message 160. Note that in the case of a 3G initiator device 110, this scenario is similar to 3G video messaging. If the recipient device is a 2G conversant device, than the application server 142 generates a .gif encoded form of the integrated video message 160.

Depending on the rendering capabilities of the recipient device 120, the application server 142 delivers an appropriate renderable form of the integrated video message 160. In the case of a 3G recipient, the 3GP encoded form is downloaded to 160 if the memory capabilities in a local buffer 124 of the recipient device are sufficient (typically about 100-300K). Similarly with 2G devices, a .gif file of 100-300K is deliverable. Alternatively, the management server 144 sends a streaming form 163 of the integrated message 160, or delivers a video message 164 to a video mailbox 126 associated with the recipient device 120 for later retrieval and rendering.

More specifically, 3G handsets and most of the new 2G handsets are capable of playing back a 3gp video file. However, the size of MMS which the handset device can accept varies from 30 k-300 k. For example, a 20 second video message in 3gp file format with acceptable quality will easily grow up to 250 k in size which is not acceptable for a number of handset devices. In many networks, the carrier imposes a size limit of only 100 k for MMS delivery. Accordingly, the binary lip-sync rendering in animated GIF to be sent in MMS provides an acceptable animated avatar image with relatively little memory requirements. In some case, as requested by the carrier, the recipient is allowed to retrieve the video message via video call where the stored message in 3gp format is streamed to the recipient over 3G32M protocol.

In the case of a 2G device or when memory limitations in the recipient handset device 120 are pertinent, the integrated video message 160 includes an MMS file having a SMIL script, the video source 150 in a .gif form, and the voice message. 3GP, although generally preferable in terms of rendered quality, may be limited by recipient device 120 memory and is employed when the video SMS subsystem determines that sufficient memory is available (usually around 200K for a 30 second rendering)

Factors affecting the delivery of the integrated video message and rendering the resulting MMS message at the recipient device 120 include:

the size of the acceptable MMS varies from 30 k-250 k among different handset devices;

the size of a 30 seconds message in 3gp format can grow up to ~200 k at least;

Not all handset devices can play 3gp files;

Typical carriers impose a size limitation of 100 k; even though individual handsets may be more robustly equipped;

The binary lip-sync avatar rendering operates to reduce the size of the animated GIF to be under 100 k for a 30 seconds message.

As indicated above, configurations herein are particularly applicable to networks and/or user handsets that have limited support and/or resources for video messaging. In the most robust case, a 3G-3G handset communication, the disclosed video subsystem employs 3G video messaging capabilities. In cases where at least one of the callers is employing a 2G transport mechanism, a synopsis of operations is as follows:

1. 3G to 2G

In this scenario, a 3G subscriber leaves:

A. a Video message via VideoSMS service logic 143 in the video SMS subsystem 140. The caller records a video message and sends it to the called party's number. Several mechanisms are available to activate processing by the Video SMS system including:

a short code pre-pended to the caller party's number software extensions to the Short Message Service Center (SMSC) or Multimedia Message Service Center (MMSC) to invoke processing by the Video SMS system.

Intelligent Network approaches where the initiator network 130 re-routes the message to the Video SMS subsystem 140 based on per-subscriber service indications in the Home Location Register (HLR) or Home Subscriber Server (HSS).

The video message can either:

Be converted to an animated GIF formatted file and send to the called party who is a 2G subscriber via MMS service.

Be converted to a talking avatar of the caller's choice and the resulting animated GIF formatted message to be sent to the called party which should be a 2G subscriber via MMS service.

B. an Audio message via the VideoSMS service logic 143. The caller records an audio message 152 and sends it to the called party's number. This message is diverted to the Video SMS system using any of the methods described above. The audio message 152 is merged with an avatar of the caller's choice and the resulting animated GIF formatted message 160 is sent to the called party via MMS service.

2. 2G to 3G

In this scenario, a 2G subscriber leaves an audio message via the VideoSMS service logic, i.e. caller calls <short access code><called party's number> to leave a message. This message is diverted to the Video SMS subsystem 140 using any of the methods described in section 1A above. The audio message 152 is merged with an avatar of the caller's choice* and the resulting video message 160' is ready for retrieval of the called party who is a 3G subscriber either through MMS or video call 3. 2G to 2G In this scenario, a 2G subscriber leaves an audio message via the VideoSMS service logic, i.e. caller calls <short access code><called party's number> to leave a message. This message is diverted to the Video SMS subsystem 140 using any of the methods described in section 1A above. The audio message 152 is merged with an avatar of the caller's choice and the resulting animated GIF formatted message 160 is sent to the called party via the MMS service.

FIGS. 4-7 are a flowchart of video message processing according to the diagram of FIG. 3, and illustrate an example sequence of processing steps and operations for implementing a configuration of the invention as disclosed herein. Alternate configurations having different ordering of steps and interconnection of network elements may be employed. Referring to FIGS. 3-7, at step 300, the method of video messaging as disclosed herein includes identifying a video source 150 for a video component of a multimedia message 160, as depicted at step 300. Depending on availability and memory capabilities of the initiator device, identifying a video source at step 301 includes receiving at least one of a stored avatar, as disclosed at step 302, or a user generated video clip, as shown at step 303. The video repository 116 stores video components 112 as files retrieved by the initiator device 110 for inclusion as the video source 150 (video component), and may be an avatar or other video segment previously uploaded, provided, or selected via the database 116. The avatar rendering requires substantially less memory depending on which of several animation methods is employed by the avatar engine. An arbitrary video clip may also be employed, but may require substantially more memory.

Figure 4:
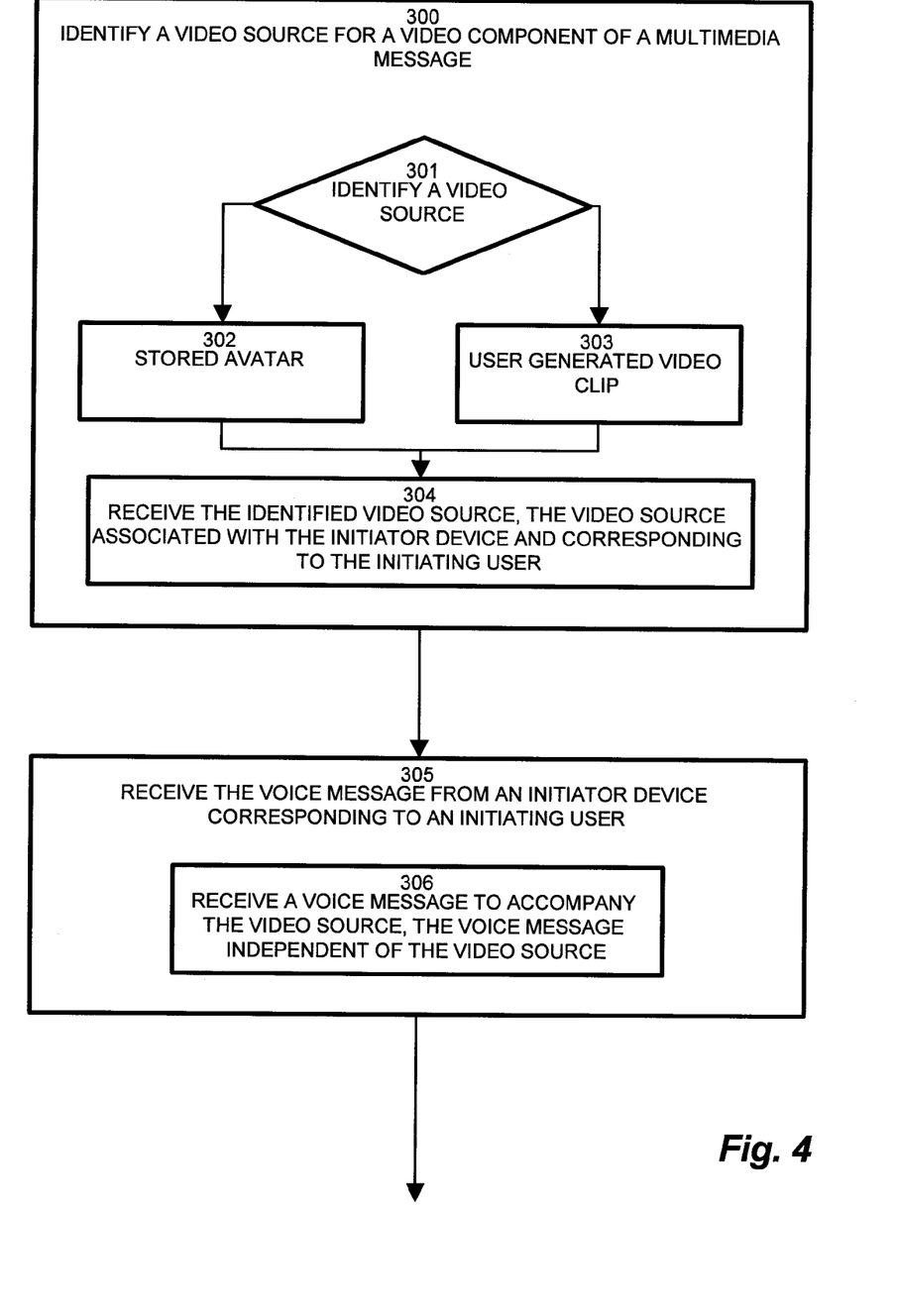
FIGS. 4-7 are a flowchart of video message processing according to the diagram of FIG. 3.

In further detail, the avatar template to be used in generating the lip-sync avatar is be stored in the database 116 in the voice SMS system 140 and the initiator can choose from a list through the use of various IVR step or pick the default one via WAP portal. In a 3G initiator scenario, the initiator may make an video call to the video SMS subsystem 140 and leave a video message (his/her own talking face, for example) to be deposit into the recipient's mail box for retrieval by the recipient via another 3G video call. Alternatively, the audio component 152 of the initiator's recording can be use to create a talking avatar inside the VSMS system 140 to be embedded in an MMS message to send to the recipient device 120, relying on the carrier's choice of service logic.

The initiator device 110 receives the identified video source 150 from the database 116, such that the video source 150 is associated with the initiator device 110 (i.e. an avatar of the user, or a video clip) and corresponds to the initiating user, as depicted at step 304. The initiator device 110 also receives the voice message 152 from the initiator device 110 corresponding to the initiating user; as shown at step 305. In the example arrangement, the video SMS subsystem 140 receives a voice message 152 to accompany the video source 150, such that the voice message 152 is independent of the video source 150, and not bound by a particular protocol or encoding format, as depicted at step 306. While some encoding formats support both voice and video, configurations herein are operable on platforms such as 2G networks where an all encompassing protocol (such as 3GP) may not be available on the initiator device 110 or the recipient device 120.

Figure 5:
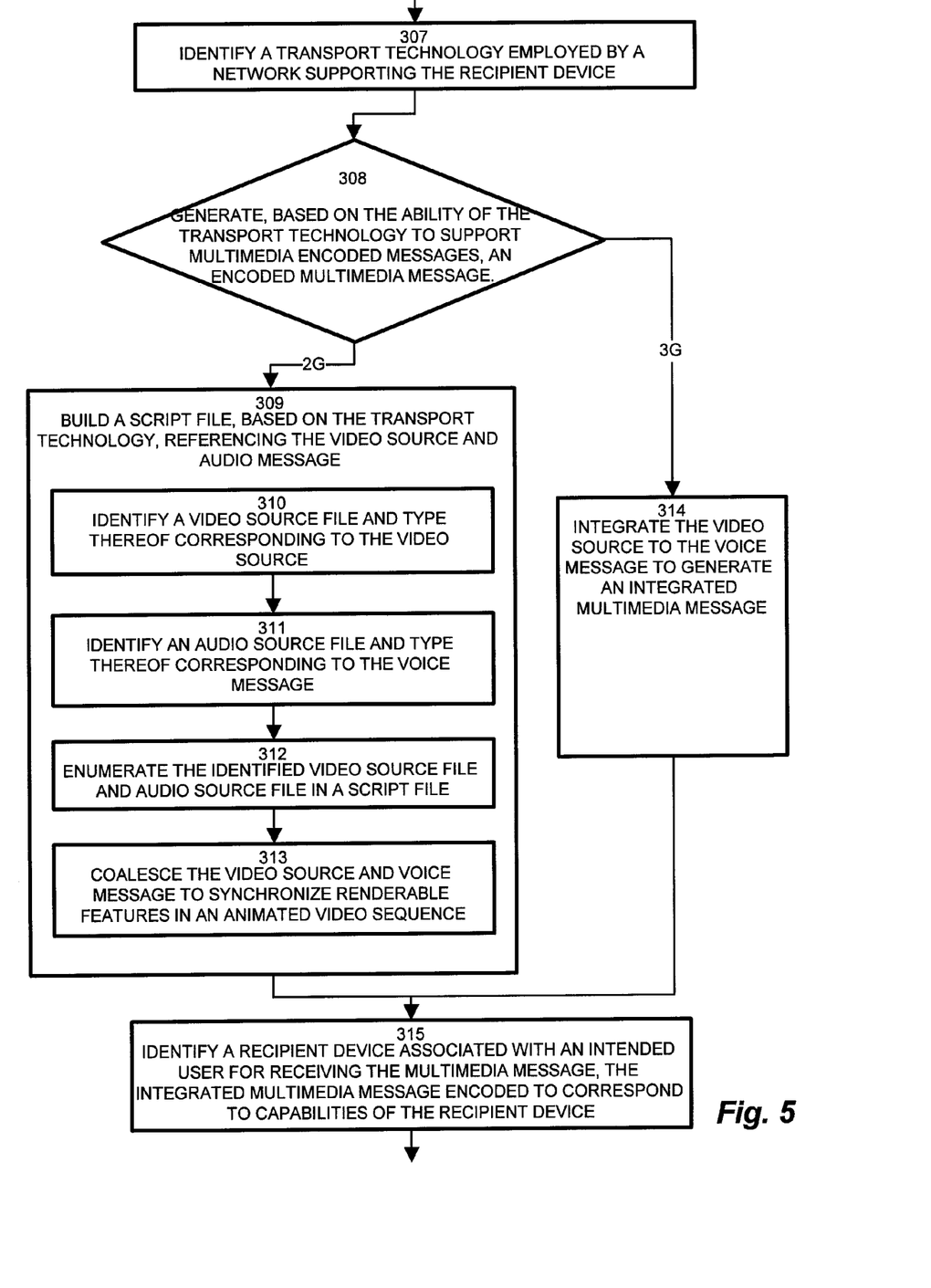

Such integration of the video source 150 and voice message 152 further include identifying a transport technology employed by a network supporting the recipient device 120, as depicted at step 307. A check is performed, at step 308, to identify whether the recipient device 120 is on a 2G or 2G network and selectively generate, based on the ability of the transport technology (e.g. 2G or 3G) to support multimedia encoded messages, an integrated multimedia message 160. If the recipient device 120 is operating within a 2G network, then the content manager 144 builds a script file 162, based on the transport technology, referencing the video source 150 and audio message 152. This includes identifying a video source file and type thereof corresponding to the video source 150, such as a .gif file including the avatar image, as depicted at step 310. The content manager 144 also identifies an audio source file and type thereof corresponding to the voice message 152, as shown at step 311. The content manager 144 enumerates the identified video source file and audio source file in a script file 162, as shown at step 312, which coalesces the video source 150 and voice message 152 to synchronize renderable features in an animated video sequence, as depicted at step 313.

Returning to step 308, if the recipient device 120 supports 3G technology, then the content manager integrates the video source 150 to the voice message 152 to generate an integrated multimedia message 160, typically in a 3GP format, as depicted at step 314. The application server 142 then identifies the recipient device 120 associated with an intended user for receiving the multimedia message, such that the integrated multimedia message 160 is encoded to correspond to capabilities of the recipient device 120, as shown at step 315.

Figure 6:
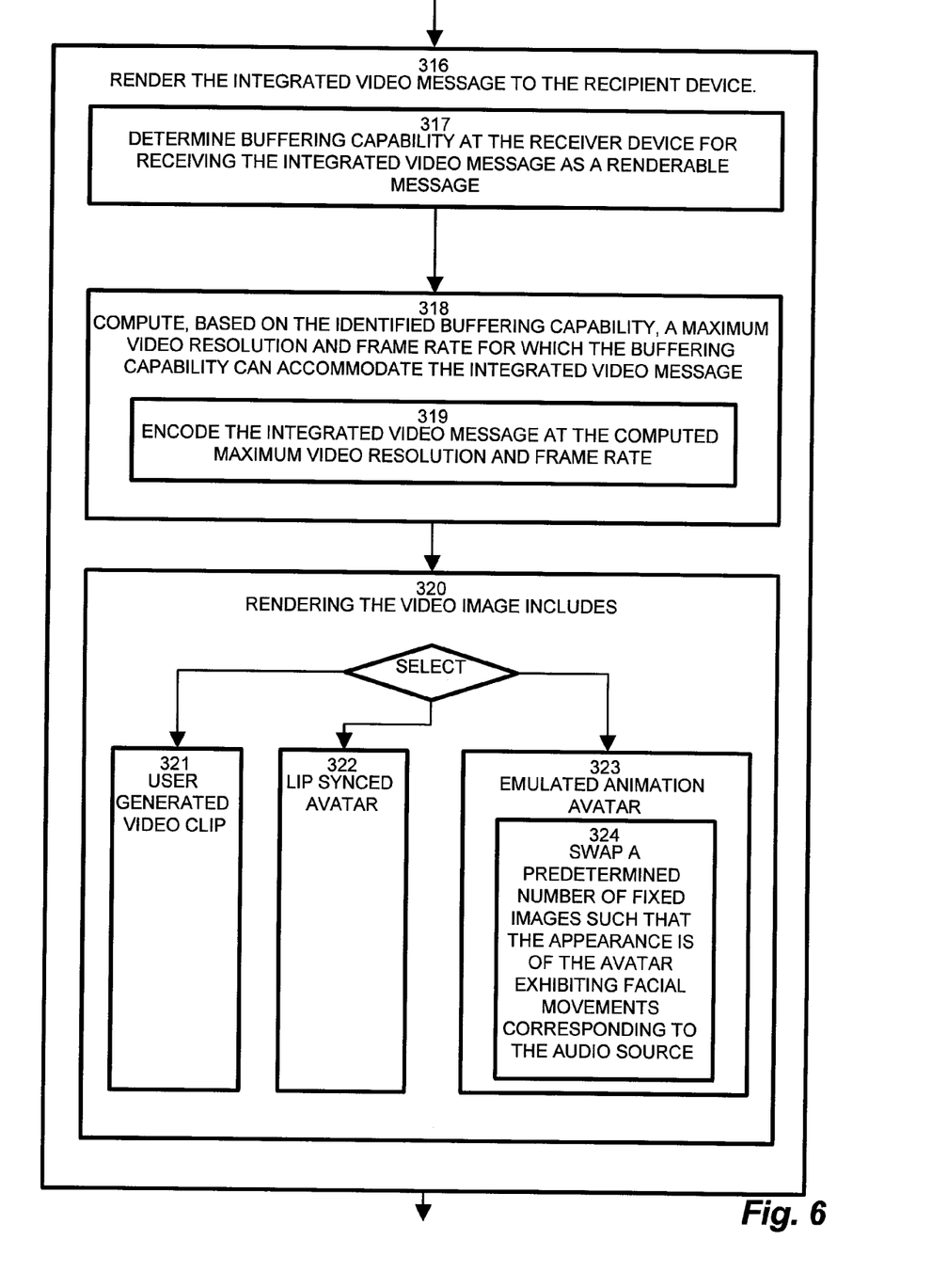

The subsystem 140 renders the integrated video message 160 to the recipient device 120 via the recipient network 132, as shown at step 316. This includes determining buffering capability at the recipient device for receiving the integrated video message as a renderable message, as disclosed at step 317. The buffering capability is used to determine resolution and frame speed of the rendered image, whether a video mailbox is available, and whether emulated animation or lip-synching animation is to be employed. The content manager 144 computes, based on the identified buffering capability, a maximum video resolution and frame rate for which the buffering capability can accommodate the integrated video message 160, as depicted at step 318, and encodes the integrated video message 160 at the computed maximum video resolution and frame rate, as shown at step 319.

In order to optimize available memory in the recipient device 120, rendering the video image includes selecting between, at step 320, a user generated video clip, as shown at step 321, a lip synced avatar, depicted at step 322, and at step 323, an emulated animation avatar. Rendering an emulated animation avatar further comprises swapping a predetermined number of fixed images such that the appearance is of the avatar exhibiting facial movements corresponding to the audio source, as depicted at step 324. The emulated animation, sometimes referred to as binary emulation, swaps a displayed image between 2 or 3 static avatar images to provide the appearance of movement (animation). Lip-synching animation augments the basic avatar image by providing facial movements, typically eye and mouth, to track the spoken (voice) component on the voice message 152.

Figure 7:
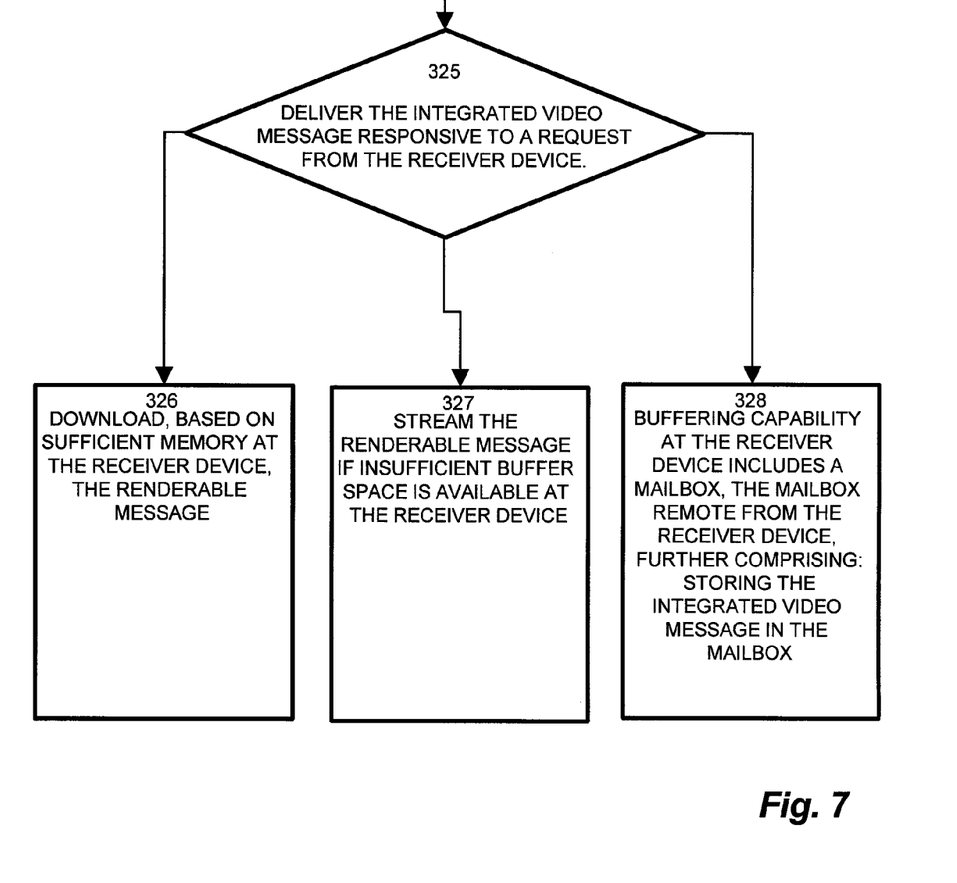

The subsystem 140 then delivers the integrated video message 160 responsive to a request from the recipient device 120, such as answering an incoming call or reading a mail message, as disclosed at step 325. The subsystem 140 selectively downloads, based on sufficient memory at the recipient device, the renderable message, as disclosed at step 326, or alternatively, may stream the renderable message 160 if insufficient buffer space is available at the recipient device, as disclosed at step 327. Typical devices are limited by downloads to 300K, and may be further limited to 100K as a result of transport (carrier network) limitations. If insufficient buffer 124 space is available at the recipient device 120, and if the device is enabled to receive a streaming transmission, such streaming alleviates the need to buffer the entire integrated video message 160 at the recipient device 120. Alternatively, the buffering capability at the recipient device 120 may includes a mailbox, the mailbox remote from the recipient device, such that delivery includes storing the integrated video message in the mailbox, as depicted at step 328.

Those skilled in the art should readily appreciate that the programs and methods for dynamic video messaging as defined herein are deliverable to a user processing and rendering device in many forms, including but not limited to a) information permanently stored on non-writeable storage media such as ROM devices, b) information alterably stored on writeable storage media such as floppy disks, magnetic tapes, CDs, RAM devices, and other magnetic and optical media, or c) information conveyed to a computer through communication media, for example using baseband signaling or broadband signaling techniques, as in an electronic network such as the Internet or telephone modem lines. The operations and methods may be implemented in a software executable object or as a set of encoded instructions for execution by a processor responsive to the instructions. Alternatively, the operations and methods disclosed herein may be embodied in whole or in part using hardware components, such as Application Specific Integrated Circuits (ASICs), Field Programmable Gate Arrays (FPGAs), state machines, controllers or other hardware components or devices, or a combination of hardware, software, and firmware components.

While the system and method for dynamic video messaging has been particularly shown and described with references to embodiments thereof, it will be understood by those skilled in the art that various changes in form and details may be made therein without departing from the scope of the invention encompassed by the appended claims.

What is claimed is:

1. A method of video messaging, comprising:
   identifying a video source for a video component of an integrated multimedia message;
   receiving a voice message to accompany the video source, the voice message independent of the video source;
   integrating the video source to the voice message to generate the integrated multimedia message;
   identifying a recipient device associated with an intended user for receiving the integrated multimedia message, the integrated multimedia message encoded to include renderings of the video source and the voice message and corresponding to capabilities of the recipient device; and
   rendering the integrated multimedia message to the recipient device,
   wherein the rendering of the integrated multimedia message includes:
     determining a buffering capability at the recipient device for receiving the integrated multimedia message as a renderable message, and
   wherein the integrating of the video source to the voice message includes:
     computing, based at least on the buffering capability, a maximum video resolution and frame rate for which the buffering capability can accommodate the integrated multimedia message; and
     encoding the integrated multimedia message at the computed maximum video resolution and frame rate.

2. The method of claim 1 further comprising:
   receiving the voice message from an initiator device corresponding to an initiating user; and
   receiving the identified video source from a video repository, the video source associated with the initiator device and corresponding to the initiating user.

3. The method of claim 2 wherein the identifying of the video source includes receiving at least one of:
   a stored avatar; and
   a user generated video clip.

4. The method of claim 1 wherein the integrating of the video source to the voice message further comprises:
   identifying a transport technology employed by a network supporting the recipient device; and
   selectively building a script file, based at least on the transport technology, referencing the video source and the voice message, or selectively generating, based at least on the ability of the transport technology to support multimedia encoded messages, an encoded multimedia message.

5. The method of claim 4 wherein the integrating of the video source to the voice message further comprises:
identifying a video source file and type thereof corresponding to the video source;
identifying an audio source file and type thereof corresponding to the voice message;
enumerating the identified video source file and audio source file in a script file; and
coalescing the video source and voice message to synchronize renderable features in an animated video sequence.

6. The method of claim 1 wherein the rendering of the integrated multimedia message further comprises:
selectively downloading the renderable message based at least on an acceptable transport size according to carrier and device limitations at the recipient device, or streaming the renderable message if insufficient buffer space is available at the recipient device.

7. The method of claim 1 wherein the buffering capability at the recipient device includes a mailbox, wherein the mailbox is remote from the recipient device, and wherein the method further comprises:
storing the integrated multimedia message in the mailbox; and
delivering the integrated multimedia message responsive to a request from the recipient device.

8. The method of claim 1 wherein the rendering of the integrated multimedia message includes selecting at least one of:
a user generated video clip;
a lip synced avatar; and
an emulated animation avatar.

9. The method of claim 8 wherein the rendering of the integrated multimedia message further comprises swapping a predetermined number of fixed images such that an appearance of the emulated animation avatar is of the emulated animation avatar exhibiting facial movements corresponding to the audio source.

10. The method of claim 1 wherein the integrated multimedia message further comprises an MMS message, and wherein the rendering of the integrated multimedia message includes:
downloading, based at least on a maximum acceptable size for MMS at the recipient device, or streaming the renderable message if a size of the MMS message exceeds the maximum acceptable size for MMS messages at the recipient device.

11. A video messaging subsystem, comprising:
a first interface operative to identify and receive a video source for a video component of an integrated multimedia message;
an application server operative to receive a voice message to accompany the video source, the voice message independent of the video source;
a content manager operative to integrate the video source to the voice message to generate the integrated multimedia message;
service logic operative to identify a recipient device associated with an intended user for receiving the integrated multimedia message, the integrated multimedia message encoded to include renderings of the video source and the voice message and corresponding to capabilities of the recipient device; and
a second interface to a recipient network, wherein the second interface is operative to render the integrated multimedia message to the recipient device, the recipient network independent from the first interface receiving the video source,
wherein the content manager is further operative:
to determine a buffering capability at the recipient device for receiving the integrated multimedia message as a renderable message;
to compute, based at least on the buffering capability, a maximum video resolution and frame rate for which the buffering capability can accommodate the integrated multimedia message; and
to encode the integrated multimedia message at the computed maximum video resolution and frame rate.

12. The subsystem of claim 11 wherein the second interface to the recipient network is responsive to an initiator device, and wherein the second interface is further operative:
to receive the voice message from the initiator device, the initiator device corresponding to an initiating user; and
to receive the identified video source, the video source associated with the initiator device and corresponding to the initiating user, and
wherein the identified video source includes at least one of:
a stored avatar; and
a user generated video clip.

13. The subsystem of claim 11 wherein the content manager is further operative:
to identify a transport technology employed by the recipient network; and
to selectively build a script file, based at least on the transport technology, referencing the video source and the voice message, the script file being a Synchronized Multimedia Integration Language (SMIL)-script referencing a .gif video source file, or to selectively generate, based at least on the ability of the transport technology to support multimedia encoded messages, an encoded multimedia message.

14. The subsystem of claim 13 wherein the content manager is further operative to integrate the video source to the voice message by:
identifying a video source file and type thereof corresponding to the video source;
identifying an audio source file and type thereof corresponding to the voice message;
enumerating the identified video source file and audio source file in a script file; and
coalescing the video source and voice message to synchronize renderable features in an animated video sequence.

15. The subsystem of claim 14 wherein the content manager is further operative:
to selectively download, based at least on sufficient memory at the recipient device, the renderable message, or to stream the renderable message if insufficient buffer space is available at the recipient device.

16. The subsystem of claim 15 wherein the integrated multimedia message further comprises an MMS message, the content manager being further operable to download, based at least on a maximum acceptable size for MMS at the recipient device, or stream the renderable message if a size of the MMS message exceeds the maximum acceptable size for MMS messages at the recipient device.

17. The subsystem of claim 11 wherein the content manager is further operative to direct the second interface:
to store the integrated multimedia message in a mailbox; and to deliver the integrated multimedia message responsive to a request from the recipient device.

18. The subsystem of claim 11 wherein the avatar engine is operative to render the video image by selecting at least one of:
   a user generated video clip;
   a lip synced avatar; and
   an emulated animation avatar.

19. The subsystem of claim 18 wherein the avatar engine is further operative to generate emulated animation by swapping a predetermined number of fixed images such that an appearance of the emulated animation avatar is of the emulated animation avatar exhibiting facial movements corresponding to the audio source.

20. A computer program product having a non-transitory computer readable medium operable to store a set of encoded instructions which, when executed by a processor responsive to the instructions, cause a computer connected to the non-transitory computer readable medium to perform video messaging, comprising:
   computer program code for identifying a video source for a video component of an integrated multimedia message;
   computer program code for receiving a voice message to accompany the video source, the voice message independent of the video source;
   computer program code for integrating the video source to the voice message to generate the integrated multimedia message, the integrating of the video source to the voice message further including:
      identifying a video source file and type thereof corresponding to the video source;
      identifying an audio source file and type thereof corresponding to the voice message;
      enumerating the identified video source file and audio source file in a script file; and
      coalescing the video source and voice message to synchronize renderable features in an animated video sequence;
   computer program code for identifying a recipient device associated with an intended user for receiving the integrated multimedia message, the integrated multimedia message encoded to correspond to capabilities of the recipient device; and
   computer program code for rendering the integrated multimedia message to the recipient device rendering the video image, the rendering of the integrated multimedia message further including:
      selecting at least one of a user generated video clip, a lip synced avatar, and an emulated animation avatar;
      swapping a predetermined number of fixed images such that an appearance of the emulated animation avatar is of the emulated animation avatar exhibiting facial movements corresponding to the audio source; and
      determining a buffering capability at the recipient device for receiving the integrated multimedia message as a renderable message, and
   wherein the integrating of the video source to the voice message further includes:
      computing, based at least on the buffering capability, a maximum video resolution and frame rate for which the buffering capability can accommodate the integrated multimedia message; and
      encoding the integrated multimedia message at the computed maximum video resolution and frame rate.

* * * * *